Figure 1:
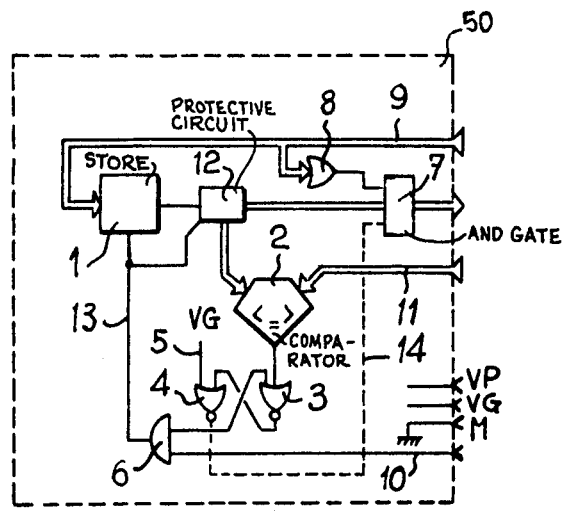

United States Patent [19]

Moreno

[11] 4,102,493
[45] Jul. 25, 1978

[54] SYSTEMS FOR STORING AND TRANSFERRING DATA

[75] Inventor: Roland Moreno, Paris, France

[73] Assignee: Societe Internationale pour l'Innovation, France

[21] Appl. No.: 686,011

[22] Filed: May 13, 1976

[30] Foreign Application Priority Data

May 13, 1975 [FR] France ................... 75 14807

[51] Int. Cl.² .................. G06K 5/00; G06K 19/06
[52] U.S. Cl. ........................... 235/419; 235/488
[58] Field of Search ............. 235/61.7 R, 61.7 B, 235/61.8 A, 61.6 R; 340/149 A, 173 R

[56] References Cited

U.S. PATENT DOCUMENTS

| | | | |
|---|---|---|---|
| 3,868,057 | 2/1975 | Chavez | 235/61.7 B |
| 3,873,019 | 3/1975 | Holcomb | 235/61.8 A |
| 3,906,460 | 9/1975 | Halpern | 235/61.7 B |
| 3,934,122 | 1/1976 | Riccitelli | 235/61.7 B |

Primary Examiner—D. W. Cook
Attorney, Agent, or Firm—Weiser, Stapler & Spivak

[57] ABSTRACT

A system for storing and transferring data in confidential manner, the system comprising: at least one independent electronic portable article, and at least one independent transfer device, the portable article comprising: at least one store for storing data in an easily transportable form containing enabling data, coupling means accessible from the exterior of the portable article and used for temporarily coupling the portable article to the transfer device, and store control circuits connected between the coupling means and the store, an identification circuit entirely contained in the portable article and connected to the store and the coupling means, the identification circuit comparing the enabling data in the store with a confidential item introduced into the transfer device by the possessor of the portable article; the store and the control circuits being constructed in the form of logic microstructures; the transfer device comprising: means actuated by the person in possession of the portable store, so as to insert a confidential item into the transfer device, and means for transferring data to the portable article.

24 Claims, 3 Drawing Figures

SYSTEMS FOR STORING AND TRANSFERRING DATA

The invention relates to systems for storing and transferring data in a confidential, personal manner by means of independent electronic portable articles; the invention relates more particularly to the electronic portable articles.

U.S. Pat. Ser. No. 560,873 dated Mar. 21, 1975 describes a system comprising at least one independent electronic portable article, and at least one transfer device.

The portable article comprises: at least one store for storing data in easily transportable form, containing enabling data, coupling means accessible from the exterior of the portable article and used for temporarily coupling the portable article to the transfer device, and store control circuits connected between the coupling means and the store.

The store and the control circuits in the portable article are in the form of logic microstructures.

The transfer device comprises means which can be actuated by the person in possession of the portable article so as to introduce a confidential item into the transfer device of the means for transferring data to or from the portable article; it also comprises an identifying comparator for comparing the enabling data in the store with a confidential item introduced into the transfer device by the person in possession of the portable article.

These systems may be used inter alia in banks or shops for distributing bank notes or for the purpose of a transaction between e.g. a tradesman and a customer. In the latter case, the customer has a portable article in the form of a payment card. In order to pay his bill, he connects the payment card to the transfer device which is e.g. associated with the trademan's till. The electronic stores of the card record the following: a confidential enabling code for identifying the owner of the payment card, the identity of the customer (his bank-account number and name) and the sequence of debit and credit operations performed with the transfer device.

The confidential enabling code is e.g. recorded in the payment card in the form of a word of several bits. The user of the payment card, who is the only person who knows the confidential number corresponding to the enabling data in the card, introduces the confidential number (e.g. by means of a key) into the transfer device. The identifying comparator in the transfer device compares the confidential code number with the enabling data in the payment card, thus confirming the identity of the card user before the debit and credit operation. If the confidential code number introduced into the transfer device by the person in possession of the card does not correspond to the word of several bits recorded in the payment card, the comparator interrupts the debit, credit and other operations performed by the transfer device, and thus ensures that the transaction does in fact concern the owner of the payment card.

However this system, though elaborate, has a disadvantage which needs to be eliminated. A swindler who is an expert in microelectronics can construct a simplified version of the transfer device so as to energise the portable article and, if the swindler wishes to read or write information in the store in the portable article. In the case, for example, of a stolen payment card, the swindler does not need to know the confidential enabling code in order to write in or modify the contents of the store of the portable article.

U.S. Pat. No. 3,806,874 Ehrat discloses a system comprising a portable electronic article and a transfer device.

The identification circuit described in the last-mentioned patent is particularly complex; it is situated partly in the portable article and partly in the transfer device. In addition, the means (key) for introducing confidential data are associated with the portable article. This results in at least two disadvantages:

Firstly, the portable article is bulky and relatively expensive to construct since it must contain means for introducing confidential data. It is known that one of the basic problems in developing these data transfer systems is to construct portable articles which are compact, cheap to manufacture and convenient to use.

Secondly, the swindler who is an expert in electronics can, as before, replace the identification circuits in the transfer device by home-made circuits for tampering with the contents of the portable article.

The systems described in U.S. Pat. Nos. 3,906,460 HALPERN and PERRON 3,859,634 do not solve the problem posed by the present application. This problem, it should be noted, is to transfer and preserve data in a personal manner. The invention, therefore, relates to systems designed to recognise the owner of the portable article, i.e. systems for distinguishing the true owner from among all people who may be in possession of the portable article (e.g. as a result of theft, fraud or loss). The systems described in the HALPERN and PERRON patents are incapable of making this distinction. Anyone in possession of the portable article (whether by fraud, theft or because he is the true owner) is enabled irrespectively. The reason is that the system merely comprises an enabling item in the portable article with a predetermined code in the transfer device; it is thus merely necessary to be in possession of the portable article in order to be enabled (irrespective of the manner in which possession has been acquired). This is because the aforementioned patents do not disclose the essential combination of a means actuated by the person in possession of the portable article in order to introduce a confidential item into the transfer device in an identification circuit.

The aim of the invention is to obviate the disadvantages which have been set out, by the means which will now be described.

According to a main feature of the invention, in order to avoid the aforementioned attempts at fraud, the portable article comprises; an identification circuit connected to the store and to the coupling means, for comparing the enabling data in the store with a confidential item introduced into the transfer device by the person in possession of the portable article.

As a result of the identification circuit inside the portable article, the swindler cannot read or modify the contents of a portable article which he has found or stolen since, before any operation, he must supply the confidential code and introduce it into the portable article by means of the transfer device, but this is impossible since the confidential code is known only to the owner of the portable article.

Preferably, when the store of the portable article is organised in $m$ words of $n$ bits, the identification circuit comprises a parallel comparator connected in parallel with the $n$ output conductors of the store and with the data transfer means via coupling means when the portable article is coupled to the transfer device.

Preferably, when the store of the portable article is organised in one-bit words and sequentially addressed, the identification circuit comprises a sequential comparator, inter alia an EXCLUSIVE OR gate connected to the store output and to the data transfer means via coupling means when the portable article is coupled to the transfer device.

Figure 2:
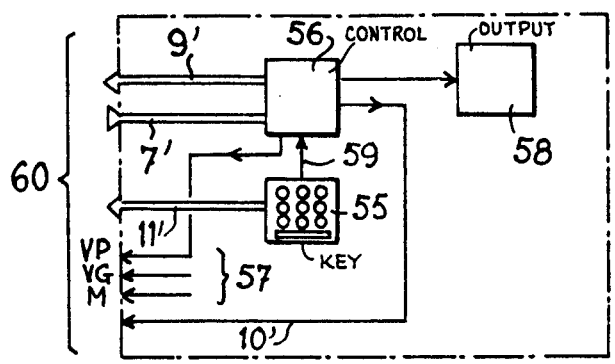
Figure 3:
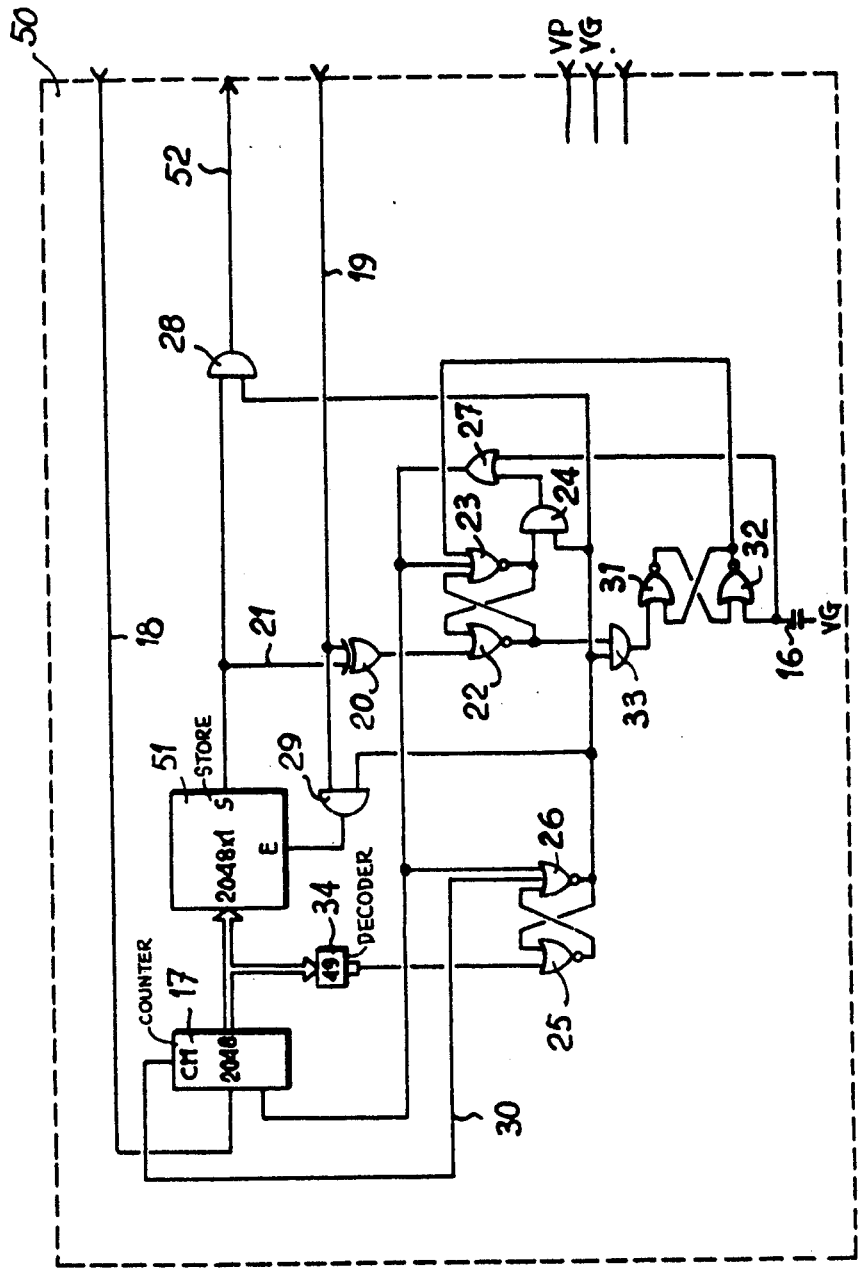

Some non-limitative embodiments of the invention will now be described with reference to the drawings, in which:

FIG. 1 shows a first variant of the portable article according to the invention, comprising a parallel-operating identification circuit, FIG. 2 shows an embodiment of a transfer device for coupling to the embodiment of the portable article described with reference to FIG. 1, and FIG. 3 shows a second embodiment of the portable article according to the invention, comprising a sequentially-operating identification circuit.

The electronic circuits in the embodiments of the portable article described hereinafter are for use in banking and are therefore incorporated in inaccessible manner in portable articles, which are inter alia in the form of a flat rectangular card. They are incorporated in inaccessible manner, i.e. the electronic circuits cannot be reached without destroying them. This result can be obtained, more particularly, by constructing them in the form of logic micro-structures (integrated circuits) and embedding them in an opaque plastic resin, but other mechanical solutions can be used. In all of the drawings illustrating the portable article (or card) a broken line denotes the casing surrounding those parts of the circuits which are electrically or optically inaccessible from the exterior.

In order to simplify the description of the electronic circuits as far as possible, the supply circuits etc, are omitted, leaving only the necessary functional circuits. With regard, however, to the coupling means, the necessary supply connections between the card and the external transfer device are indicated by the references VP, VG and earth M, which respectively denote the source of write-in voltage, the general supply source for the logic circuits and the zero-volts line.

The coupling means (bars, combs, etc) are the only elements giving electrical or optical access to the electronic components inside the card.

The monolithic read-only stores in these embodiments can be of various natures, inter alia programmable or reprogrammable. Stores of this kind do not need any energy for storing information. On the other hand, a considerable amount of energy (a number of instantaneous watts) are generally needed for writing in information; consequently the manufacturers guarantee an extremely long storage life, of the order of several decades in the case of reprogrammable stores. The following references for this type of stores may be cited:

INTEL 1702 and NATIONAL SEMI-CONDUCTOR 5203; these stores can be erased by exposure to an ultra-violet ray or X-ray source;

HARRIS 7620, MONOLITHIC MEMORIES 6340, TEXAS INSTRUMENTS 74 S 387, INTERSIL 5604; these stores are nonerasable (destructible) and are the kind involving fuses or the breakdown of junctions.

4096-bit capacitances are conventionally manufactured by some designers, inter alia by the (erasable) MOS store technique. Thus, modern methods of interconnecting integrated circuit pellets can be used at low expense to construct a 16 kbit or 32 kbit store unit (four or eight pellets) on an area of a few tens of $mm^2$, including the special circuits according to the invention, so that the unit can be included in a card having the following dimensions: $2 \times 60 \times 80$ mm.

These semi-conductors monolithic read-only stores have appreciable advantages over other read-only stores such as magnetic cassettes and flexible discs. They are more reliable, smaller, do not require mechanical movements for reading the information, are insensitive to magnetic fields, and are difficult to imitate or tamper with (since a swindler has to use complex electronic means in order to modify the state of a semiconductor read-only store). Consequently, the aforementioned semi-conductor read-only stores are particularly suitable, in preference to others, for use in storage systems according to the invention, more particularly in applications of the systems relating to banks.

A description will now be given of FIG. 1, which shows a first embodiment of the portable article according to the invention comprising a parallel-operating identification circuit, inter alia comprising a comparator.

A portable article 50 comprises a programmable store 1, e.g. containing $256 \times 8$ bits, addressed by a conductor 9 made up of eight wires. Article 50 also comprises a parallel comparator 2, a trigger circuit comprising NOR gates 3 and 4, a capacitor 5, an AND gate having two inputs 6, an AND gate having 10 inputs 7, an OR gate having eight inputs 8 and a protective circuit 12.

A description will now be given of the operation of the first embodiment of the portable article. A confidential code (from 0 to 99 in BCD code) is written into the first address (00000000) of the store at the time when the latter is manufactured, e.g. when the electrical operation tests are made). When the article is energised, capacitor 5 emits a single pulse which automatically resets the trigger output to zero. However, if the comparator output is energised at this moment, the trigger output remains permanently in the upper logic state. Depending on the position of the trigger, the write-in authorisation gate 6 will be open or shut, thus enabling or not enabling the write-in actuating means 20. The output of the lead 6 is connected to a store disconnection input 13 (frequently called "CS", "E" or "ME" in the technical literature).

The "confidential code" supplied by the user of the portable article to the transfer device (FIG. 2) is conveyed along conductor 11. To ensure that the confidential code inside the portable object cannot be detected from the exterior, an OR gate 8 connected to the addressing input closes the output gate if there is no address.

If required, a conductor 14 can also prevent readout if there is lack of agreement between the two confidential codes.

A protective circuit 12 ensures that the write-in operations proceed in the proper manner (by protecting the circuits connected to the store output).

The supply points of the portable circuit are represented by the conductors VP, VG and the earth M.

A description will not be given of FIG. 2 representing an embodiment of a transfer device for coupling to the embodiment of the portable article described with reference to FIG. 1.

The transfer device comprises three main components: A key 55 (a means actuated by the person in possession of the portable article) is used to tabulate the confidential code and transmit it via conductors 11' and 11 (FIG. 1) to the store of the portable article; key 55 is also used for tabulation and transmission via conductor 59 of the data which are to be introduced into the portable article.

A control means 56 (used for transferring data to the portable article) ensures that the different operating sequences — i.e. addressing by conductors 9' and 9 (FIG. 1), reading-out via conductors 7' and 7 (FIG. 1) and writing-in via conductors 7', 10', VP and 7, 10, VP (FIG. 1) -proceed in the proper manner.

And output means (58) (e.g. a printer or display screen etc) displays the data on which operations are performed.

These components are themselves known and within the scope of the skilled addressee, and need not therefore be described in detail.

The bunch of conductors 57 is used to supply the portable article, (VG, M) and for writing-in (VP) if required, actuated by the control means 56.

The components in the transfer device have been surrounded by a chain-dotted line to show the coupling means 60 which are adapted to be coupled to the coupling means of the portable article.

A description will now be given of FIG. 3, which represents a second embodiment of the portable article according to the invention comprising a sequentially-operating identification circuit, comprising a comparator.

As in the case of the preceding embodiment of the portable article, in order to reduce the risk of divulging the confidential code, the comparison is made from the outside of the portable article.

In addition, owing to the sequential addressing, a preliminary comparison has to be made, irrespective of the fraudulent means used.

The confidential code (e.g of 50 bits) belonging to the portable article is stored in the first addresses in the store and is compared in the portable article with the cross-checking code, which is transmitted thereto from outside the card by the transfer device (see FIG. 2). If there is agreement, the addressing and writing-in, if any, can proceed, whereas if there is a discrepancy, the addressing counter is systematically reset to zero at the end of the comparison period, so that no information can be obtained about the position of the first non-concordant bit.

Store 51 is organised into one-bit words, e.g. 2048 one-bit words.

When power is applied, a single pulse emitted by capacitor 16 resets counter 17 and the different trigger circuits to zero. During the time when the clock pulses are being conveyed from the exterior of the transfer device along conductor 18, the 50 successive bits corresponding to the confidential code are brought on the transfer device to the input of the sequential comparator 20 (an EXCLUSIVE-OR gate) via conductor 19.

If there is a discrepancy between this information and the information coming from the store via conductor 21, the trigger circuit R-S comprising NOR gates 22 and 23 changes state, thus maintaining a logic level 1 at the input of AND gate 24. When the decoder means 34 detects the state 49 of the counter (corresponding to the 50th address in the store) the trigger comprising NOR gates 25 and 26 changes state, thus producing a level 1 at the second input of gate 24, which consequently triggers a general zero-resetting order via OR gate 27.

If there is a discrepancy between the two confidential codes, the fact that the output of gate 26 is permanently at level 1 has no effect on gate 24 (since gate 23 has not changed state). However, logic level 1 opens the output gate 28 and the write-in gate 29, thus henceforth authorising the reading-out (via conductor 52) and writing-in (via conductor 19) in conjunction with the transfer device.

Conductor 30, which is connected to the CM ("maximum counting") output of counter 17, is used for resetting the output of gate 26 to zero, so that the data in the first 50 store addresses never leave the portable circuit. Gate 28 is systematically closed between store address 0 and store address 49.

Furthermore, the trigger circuit R-S comprising NOR gates 31 and 32 can store the exact confidential code, by means of AND gate 33 which, in this case, maintains a level 1 at the output of gate 32, thus keeping the output of gate 33 at zero. It is thus unnecessary to supply a confidential code systematically to the device at each new addressing operation passing through zero, during a single operation (energisation). The 50 bits making up the confidential code can e.g. represent an arrangement of 10 letters of the alphabet.

One method of fraud, in the case of a confident, well-informed swindler having a large supply of instruments, would be to use a programmed automatic unit to supply the store at high speed with all possible combinations of a 10-letter word.

However, if the clock speed is 1 MHz, 230 years of uninterrupted operation would be necessary for exploring all the combinations.

The transfer device for coupling to the embodiment of the portable article described with reference to FIG. 3 is of the same kind as the transfer device described with reference to FIG. 2, except in structural details within the scope of the skilled addressee, allowing for the fact that store 51 is organised in one-bit words and is sequentially addressed. A transfer device of this kind has been described in detail in U.S. patent application Ser. No. 560,873 dated Mar. 21, 1975.

The invention has now been described and its importance has been confirmed in detailed examples. The Applicants reserve the exclusive rights thereto, during the entire life of the patent, without limitations other than those in the following claims.

I claim:

1. A system for storing and transferring data in confidential manner, the system comprising: at least one independent electronic portable article, and at least one independent transfer device, the portable article comprising: at least one store for storing data in an easily transportable form containing enabling data, coupling means accessible from the exterior of the portable article and used for temporarily coupling the portable article to the transfer device, and store control circuits connected between the coupling means and the store, an identification circuit entirely contained in the portable article and connected to the store and the coupling means, the identification circuit comparing the enabling data in the store with a confidential item introduced into the transfer device by the possessor of the portable article; the store and the control circuits being constructed in the form of logic microstructures; the transfer device comprising: means actuated by the person in possession of the portable store, so as to insert a confidential item into the transfer device, and means for transferring data to the portable article.

2. A system according to claim 1, such that: the store in the portable article is organised in *m* words containing *n* bits, the system being characterised in that: the identification circuit comprises a parallel comparator connected in parallel to the *n* store output conductors and to the data transfer means via coupling means when the portable article is coupled to the transfer device.

3. A system according to claim 2, characterised in that the parallel comparator actuates at least one authorisation gate for transferring data via a store circuit with which it is connected in series.

4. A system according to claim 3, characterised in that the store circuit comprises a trigger circuit.

5. A system according to claim 2, such that the enabling data are in the store at given addresses, the system being characterised in that the portable article comprises an address detector connected to the store addressing circuit and actuating at least one gate authorising transfers.

6. A system according to claim 5, such that the data to be compared are contained in the first address, the system being characterised in that the address detector comprises an OR gate connected in parallel to the store addressing circuit.

7. A system according to claim 1, such that the store organised in one-bit words is sequentially addressed, the system being characterised in that the identification circuit comprises a sequential comparator connected to the store output and to the data transfer means via coupling means when the portable article is coupled to the transfer device.

8. A system according to claim 7, characterised in that the sequential comparator is an EXCLUSIVE OR gate.

9. A system according to claim 8, characterised in that the sequential comparator actuates at least one transfer-authorising gate via a store circuit associated with an address detector connected in parallel to the store addressing circuit.

10. A system according to claim 9, characterised in that the enabling data are contained in the first *n* addresses in the store, and the store is addressed bit by bit by an addressing counter actuated by a clock, the system being characterised in that the addressing counter is in the portable article.

11. A system according to claim 10, characterised in that the address detector is a decoding means connected in parallel to the store addressing circuit at the addressing counter output.

12. An independent electronic portable article designed to store and transfer data in confidential manner, for coupling to a data transfer device, the portable article comprising: at least one store for storing data in easily transportable form containing enabling data, coupling means accessible from the exterior of the portable article and used for temporarily coupling the portable article to the transfer device, said coupling means comprising input means, the portable article comprising further store actuating circuits connected between the coupling means and the store, and an identification circuit connected between the store and the input means of the coupling means and comparing the enabling data in the store with a confidential item which is introduced into the transfer device by the possessor of the portable article and transferred therein through the input means, the store and control circuits being constructed in the form of logic microstructures.

13. A portable article according to claim 12, such that the store in the portable article is organised into *m* words of *n* bits, the portable article being characterised in that the identification circuit comprises a parallel comparator connected in parallel to the *n* output conductors of the store and to the data transfer device via coupling means when the portable article is coupled to the transfer device.

14. A portable article according to claim 13, characterised in that the parallel comparator actuates at least one gate for authorising the transfer of data via a store circuit with which it is connected in series.

15. A portable article according to claim 14, characterised in that the store circuit comprises a trigger circuit.

16. A portable article according to claim 13, such that: the enabling date are in the store at given addresses; the portable article being characterised in that it comprises an address detector connected to the store addressing circuit and actuating at least one transfer-authorising gate.

17. A portable article according to claim 16, such that the data to be compared are contained in the first address, the portable article being characterised in that the address detector comprises an OR gate connected in parallel to the addressing circuit in the store.

18. A portable article according to claim 13, characterised in that the store is organised in one-bit words and sequentially addressed, the portable article being characterised in that the identification circuit comprises a sequential comparator connected to the store output and to a data transfer device via coupling means when the portable article is coupled to the transfer device.

19. A portable article according to claim 18, characterised in that the sequential comparator is an EXCLUSIVE OR gate.

20. A portable article according to claim 19, characterised in that the sequential comparator actuates at least one transfer authorisation gate via a store circuit associated with an address detector connected in parallel to the addressing circuit in the store.

21. A portable article according to claim 20, such that the enabling data are contained in the first *n* addresses in the store, and the store is addressed bit by bit by an address counter actuated by a clock in the transfer device.

22. A portable article according to claim 21, characterised in that the address detector is a decoding means connected in parallel to the store addressing circuit at the output of the addressing counter.

23. A system for storing and tranferring data in confidential manner, the system comprising: at least one independent electronic portable article, and at least one independent transfer device, the portable article comprising: at least one store for storing data in an easily transportable form containing enabling data, coupling means accessible from the exterior of the portable article and used for temporarily coupling the portable article to the transfer device, said coupling means comprising input means, the portable article comprising further store control circuits connected between the coupling means and the store, and identification circuit entirely contained in the portable article and connected between the store and the input means of the coupling means, the identification circuit comparing the enabling data in the store with a confidential item introduced into the transfer device by the possessor of the portable article and transferred therein through the input means; the store and the control circuits being constructed in the form of logic microstructures; the transfer device comprising: means actuated by the person in possession of the portable store, so as to insert a confidential item into the tranfer device, and means for transferring data to the portable article.

24. An independent electronic portable article designed to store and transfer data in confidential manner, for coupling to a data transfer device, the portable article comprising: at least one store for storing data in easily transportable form containing enabling data, the store being organized into $m$ words of $n$ bits, coupling means accessible from the exterior of the portable article and used for temporarily coupling the portable article to the transfer device, store actuating circuits connected between the coupling means and the store, and an identification circuit connected to the store and to the coupling means and comparing the enabling data in the store with a confidential item which is introduced into the tranfer device by the possessor of the portable article and transferred therein, the store and control circuits being constructed in the form of logic microstructures, and the identification circuit comprising a parallel comparator connected in parallel to the $n$ output conductors of the store and to the data transfer device via coupling means when the portable article is coupled to the tranfer device.

* * * * *